US007831202B2

(12) United States Patent
Karabinis

(10) Patent No.: US 7,831,202 B2
(45) Date of Patent: Nov. 9, 2010

(54) SATELLITE COMMUNICATIONS SYSTEMS AND METHODS USING SUBSTANTIALLY CO-LOCATED FEEDER LINK ANTENNAS

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 987 days.

(21) Appl. No.: 11/463,120

(22) Filed: Aug. 8, 2006

(65) Prior Publication Data

US 2007/0037514 A1 Feb. 15, 2007

Related U.S. Application Data

(60) Provisional application No. 60/706,823, filed on Aug. 9, 2005.

(51) Int. Cl.
*H04B 7/185* (2006.01)
(52) U.S. Cl. ........................... 455/13.3; 343/705
(58) Field of Classification Search ............... 455/13.3
See application file for complete search history.

(56) References Cited

U.S. PATENT DOCUMENTS

| | | | | |
|---|---|---|---|---|
| 4,240,079 A | * | 12/1980 | Zhilin | 342/352 |
| 4,375,697 A | * | 3/1983 | Visher | 455/13.1 |
| 4,901,307 A | | 2/1990 | Gilhousen et al. | |
| 4,985,706 A | * | 1/1991 | Schukat | 342/352 |
| 5,017,926 A | * | 5/1991 | Ames et al. | 342/353 |
| 5,073,900 A | | 12/1991 | Mallinckrodt | |
| 5,126,748 A | * | 6/1992 | Ames et al. | 342/353 |
| 5,303,286 A | | 4/1994 | Wiedeman | |
| 5,339,330 A | | 8/1994 | Mallinckrodt | |
| 5,394,561 A | | 2/1995 | Freeburg | |

(Continued)

FOREIGN PATENT DOCUMENTS

EP 0 506 255 A2 9/1992

(Continued)

OTHER PUBLICATIONS

International Search Report and Written Opinion for PCT/US2006/030880; date of mailing Sep. 2, 2007.

(Continued)

*Primary Examiner*—Duc Nguyen
*Assistant Examiner*—Hai V Nguyen
(74) *Attorney, Agent, or Firm*—Myers Bigel Sibley & Sajovec, P.A.

(57) ABSTRACT

A satellite communications system includes a plurality of feeder link antennas, a primary satellite, and an auxiliary satellite. The feeder link antennas are substantially co-located relative to one another. The primary satellite is configured to receive information over a plurality of return service links from radioterminals, to communicate a first portion of the information over at least one return feeder link directly to a first one of the feeder link antennas, and to communicate a second portion of the information over at least one inter-satellite link. The auxiliary satellite is spaced apart from the primary satellite, and configured to receive the second portion of the information from the primary satellite via the at least one inter-satellite link, and to communicate the second portion of the information across at least one return feeder link to a second one of the feeder link antennas.

54 Claims, 5 Drawing Sheets

U.S. PATENT DOCUMENTS

| | | | |
|---|---|---|---|
| 5,446,756 A | 8/1995 | Mallinckrodt | |
| 5,448,623 A | 9/1995 | Wiedeman et al. | |
| 5,511,233 A | 4/1996 | Otten | |
| 5,537,679 A * | 7/1996 | Crosbie et al. | 455/13.2 |
| 5,555,257 A | 9/1996 | Dent | |
| 5,584,046 A | 12/1996 | Martinez et al. | |
| 5,612,703 A | 3/1997 | Mallinckrodt | |
| 5,619,525 A | 4/1997 | Wiedeman et al. | |
| 5,631,898 A | 5/1997 | Dent | |
| 5,761,605 A | 6/1998 | Tawil et al. | |
| 5,765,098 A | 6/1998 | Bella | |
| 5,812,932 A * | 9/1998 | Wiedeman et al. | 455/13.1 |
| 5,812,947 A | 9/1998 | Dent | |
| 5,832,379 A | 11/1998 | Mallinckrodt | |
| 5,835,857 A | 11/1998 | Otten | |
| 5,839,053 A * | 11/1998 | Bosch et al. | 455/13.1 |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,887,257 A * | 3/1999 | Olds | 455/427 |
| 5,906,337 A * | 5/1999 | Williams et al. | 244/158.4 |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,971,324 A * | 10/1999 | Williams et al. | 244/158.4 |
| 5,991,345 A | 11/1999 | Ramasastry | |
| 5,995,832 A | 11/1999 | Mallinckrodt | |
| 6,002,916 A * | 12/1999 | Lynch | 455/13.1 |
| 6,011,951 A | 1/2000 | King et al. | |
| 6,018,658 A * | 1/2000 | Blachier | 455/427 |
| 6,023,605 A * | 2/2000 | Sasaki et al. | 455/12.1 |
| 6,023,606 A * | 2/2000 | Monte et al. | 455/13.1 |
| 6,031,334 A | 2/2000 | Meyer | 315/111.01 |
| 6,032,041 A * | 2/2000 | Wainfan et al. | 455/427 |
| 6,047,161 A * | 4/2000 | Sowles et al. | 455/12.1 |
| 6,052,560 A | 4/2000 | Karabinis | |
| 6,052,586 A | 4/2000 | Karabinis | |
| 6,064,859 A * | 5/2000 | Leopold et al. | 455/13.1 |
| 6,067,442 A | 5/2000 | Wiedeman et al. | |
| 6,072,430 A | 6/2000 | Wyrwas et al. | |
| 6,078,810 A * | 6/2000 | Olds et al. | 455/428 |
| 6,085,094 A | 7/2000 | Vasudevan et al. | |
| 6,088,571 A * | 7/2000 | Kane et al. | 455/12.1 |
| 6,091,933 A | 7/2000 | Sherman et al. | |
| 6,097,752 A | 8/2000 | Wiedeman et al. | |
| 6,101,385 A | 8/2000 | Monte et al. | |
| 6,104,911 A * | 8/2000 | Diekelman | 455/13.1 |
| 6,108,561 A | 8/2000 | Mallinckrodt | |
| 6,125,261 A * | 9/2000 | Anselmo et al. | 455/12.1 |
| 6,134,437 A | 10/2000 | Karabinis et al. | |
| 6,138,012 A * | 10/2000 | Krutz et al. | 455/427 |
| 6,157,811 A | 12/2000 | Dent | |
| 6,157,834 A | 12/2000 | Helm et al. | |
| 6,160,994 A * | 12/2000 | Wiedeman | 455/12.1 |
| 6,169,878 B1 | 1/2001 | Tawil et al. | |
| 6,198,730 B1 | 3/2001 | Hogberg et al. | |
| 6,198,921 B1 * | 3/2001 | Youssefzadeh et al. | 455/428 |
| 6,201,967 B1 | 3/2001 | Goerke | |
| 6,226,493 B1 * | 5/2001 | Leopold et al. | 455/13.1 |
| 6,226,494 B1 * | 5/2001 | Lundstrom et al. | 455/13.1 |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,257,526 B1 * | 7/2001 | Taormina et al. | 244/158.4 |
| 6,272,317 B1 * | 8/2001 | Houston et al. | 455/13.1 |
| 6,292,659 B1 * | 9/2001 | Olds et al. | 455/427 |
| 6,324,381 B1 * | 11/2001 | Anselmo et al. | 455/12.1 |
| 6,324,405 B1 | 11/2001 | Young et al. | |
| 6,333,924 B1 * | 12/2001 | Porcelli et al. | 370/331 |
| 6,336,030 B2 * | 1/2002 | Houston et al. | 455/13.2 |
| 6,336,612 B1 * | 1/2002 | Taormina et al. | 244/158.4 |
| 6,339,707 B1 * | 1/2002 | Wainfan et al. | 455/427 |
| 6,349,195 B1 * | 2/2002 | Saunders | 455/12.1 |
| 6,418,147 B1 | 7/2002 | Wiedeman | |
| 6,449,461 B1 | 9/2002 | Otten | |
| 6,460,808 B2 * | 10/2002 | Taormina et al. | 244/158.4 |
| 6,486,907 B1 * | 11/2002 | Farber et al. | 725/78 |
| 6,487,476 B1 * | 11/2002 | Draim | 701/13 |
| 6,501,941 B1 * | 12/2002 | Chang et al. | 455/13.1 |
| 6,522,865 B1 | 2/2003 | Otten | |
| 6,529,740 B1 * | 3/2003 | Ganucheau, Jr. et al. | 455/519 |
| 6,556,808 B1 * | 4/2003 | De La Chapelle et al. | 455/12.1 |
| 6,560,565 B2 * | 5/2003 | Roy et al. | 702/188 |
| 6,606,307 B1 * | 8/2003 | Novak, III et al. | 370/316 |
| 6,628,919 B1 | 9/2003 | Curello et al. | |
| 6,678,520 B1 * | 1/2004 | Wang | 455/428 |
| 6,684,057 B2 | 1/2004 | Karabinis | |
| 6,708,029 B2 * | 3/2004 | Wesel | 455/428 |
| 6,735,437 B2 | 5/2004 | Mayfield et al. | |
| 6,745,006 B2 * | 6/2004 | Shaneyfelt | 455/13.1 |
| 6,766,987 B2 * | 7/2004 | Taormina et al. | 244/158.4 |
| 6,775,251 B1 | 8/2004 | Wiedeman | |
| 6,785,543 B2 | 8/2004 | Karabinis | |
| 6,807,397 B2 * | 10/2004 | Chang et al. | 455/13.1 |
| 6,847,867 B1 | 1/2005 | Elliott | |
| 6,856,787 B2 | 2/2005 | Karabinis | |
| 6,859,652 B2 | 2/2005 | Karabinis et al. | |
| 6,868,316 B1 * | 3/2005 | Stevens | 701/13 |
| 6,879,829 B2 | 4/2005 | Dutta et al. | |
| 6,892,068 B2 | 5/2005 | Karabinis et al. | |
| 6,931,232 B1 * | 8/2005 | Wolcott | 455/12.1 |
| 6,937,857 B2 * | 8/2005 | Karabinis | 455/428 |
| 6,941,138 B1 * | 9/2005 | Chang et al. | 455/427 |
| 6,950,060 B1 * | 9/2005 | Klein | 342/358 |
| 6,956,814 B1 * | 10/2005 | Campanella | 370/210 |
| 6,975,837 B1 | 12/2005 | Santoru | |
| 6,999,720 B2 | 2/2006 | Karabinis | |
| 7,006,789 B2 | 2/2006 | Karabinis et al. | |
| 7,020,462 B1 * | 3/2006 | Wesel | 455/427 |
| 7,027,769 B1 * | 4/2006 | Rosen et al. | 455/11.1 |
| 7,031,702 B2 | 4/2006 | Karabinis et al. | |
| 7,039,400 B2 | 5/2006 | Karabinis et al. | |
| 7,043,198 B2 * | 5/2006 | Hanson et al. | 455/13.1 |
| 7,062,267 B2 | 6/2006 | Karabinis | |
| 7,068,975 B2 * | 6/2006 | Loner | 455/12.1 |
| 7,136,620 B2 * | 11/2006 | Wang | 455/13.1 |
| 7,165,365 B1 * | 1/2007 | Wang | 52/220.1 |
| RE39,503 E * | 3/2007 | Lynch | 455/13.1 |
| 7,215,954 B1 * | 5/2007 | Yung et al. | 455/430 |
| 7,324,056 B2 * | 1/2008 | Wesel | 343/766 |
| 7,324,465 B2 * | 1/2008 | Lim et al. | 370/278 |
| 7,339,520 B2 * | 3/2008 | Chang et al. | 342/359 |
| 7,359,700 B2 * | 4/2008 | Swensen et al. | 455/422.1 |
| 7,379,088 B2 * | 5/2008 | Krill et al. | 348/144 |
| 7,379,673 B2 * | 5/2008 | Krill et al. | 398/118 |
| 7,400,857 B2 * | 7/2008 | Chang et al. | 455/12.1 |
| 7,418,236 B2 * | 8/2008 | Levin et al. | 455/12.1 |
| 7,453,396 B2 * | 11/2008 | Levin et al. | 342/357.1 |
| 7,558,569 B2 * | 7/2009 | Chang et al. | 455/428 |
| 7,561,802 B2 * | 7/2009 | Krill et al. | 398/121 |
| 7,599,305 B2 * | 10/2009 | Bui | 370/252 |
| 7,627,284 B2 * | 12/2009 | Wang | 455/13.1 |
| 7,639,646 B2 * | 12/2009 | Schiff | 370/331 |
| 2002/0077099 A1 * | 6/2002 | LaPrade | 455/430 |
| 2002/0102939 A1 | 8/2002 | Shaneyfelt | |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0022625 A1 | 1/2003 | Otten et al. | |
| 2003/0054762 A1 | 3/2003 | Karabinis | |

| | | |
|---|---|---|
| 2003/0054815 A1 | 3/2003 | Karabinis |
| 2003/0068978 A1 | 4/2003 | Karabinis et al. |
| 2003/0149986 A1 | 8/2003 | Mayfield et al. |
| 2003/0153308 A1 | 8/2003 | Karabinis |
| 2003/0181161 A1* | 9/2003 | Harles et al. ............... 455/12.1 |
| 2003/0204851 A1* | 10/2003 | Powell et al. .................. 725/63 |
| 2004/0072539 A1 | 4/2004 | Monte et al. |
| 2004/0102156 A1* | 5/2004 | Loner ......................... 455/12.1 |
| 2004/0121727 A1 | 6/2004 | Karabinis |
| 2004/0142660 A1 | 7/2004 | Churan |
| 2004/0174822 A1* | 9/2004 | Bui ............................ 370/252 |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Karabinis et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0207375 A1* | 9/2005 | Schiff ......................... 370/331 |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0250511 A1* | 11/2005 | Xiao et al. ................... 455/453 |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0040657 A1 | 2/2006 | Karabinis et al. |
| 2006/0040659 A1 | 2/2006 | Karabinis |
| 2006/0094352 A1 | 5/2006 | Karabinis |
| 2006/0094420 A1 | 5/2006 | Karabinis |
| 2006/0105707 A1 | 5/2006 | Karabinis |
| 2006/0111041 A1 | 5/2006 | Karabinis |
| 2006/0135058 A1 | 6/2006 | Karabinis |
| 2006/0135060 A1 | 6/2006 | Karabinis |
| 2006/0135070 A1* | 6/2006 | Karabinis ................... 455/63.1 |
| 2007/0010246 A1* | 1/2007 | Churan ....................... 455/427 |
| 2007/0015460 A1* | 1/2007 | Karabinis et al. .......... 455/12.1 |
| 2007/0072603 A1* | 3/2007 | Wang ......................... 455/427 |

FOREIGN PATENT DOCUMENTS

| | | |
|---|---|---|
| EP | 0 597 225 A1 | 5/1994 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 122 894 A2 | 8/2001 |
| EP | 1 193 989 A1 | 4/2002 |
| WO | WO 01/54314 A1 | 7/2001 |

OTHER PUBLICATIONS

Communication pursuant to Article 94(3) EPC, EP 06 800 962.0-1246, Dec. 15, 2008.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

\* cited by examiner

SATELLITE COMMUNICATIONS SYSTEMS AND METHODS USING SUBSTANTIALLY CO-LOCATED FEEDER LINK ANTENNAS

FIELD OF THE INVENTION

The present application claims the benefit of priority to U.S. Provisional Application Ser. No. 60/706,823 filed Aug. 9, 2005, the disclosure of which is hereby incorporated herein in its entirety by reference.

FIELD OF THE INVENTION

This invention relates to wireless communications systems and methods, and more particularly to satellite communications systems and methods.

BACKGROUND OF THE INVENTION

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones and feeder link antennas.

A satellite radiotelephone communications system or method may utilize a single satellite antenna pattern (beam or cell) covering an entire service region served by the system. Alternatively or in combination with the above, in cellular satellite radiotelephone communications systems and methods, multiple satellite antenna patterns (beams or cells) are provided, each of which can serve a substantially distinct service region in an overall service region, to collectively provide service to the overall service region. Thus, a cellular architecture that is similar to that used in conventional terrestrial cellular radiotelephone systems and methods can be implemented in cellular satellite-based systems and methods.

FIG. 1 is a schematic diagram that illustrates a satellite communications system 100 that includes a space based component 102, radioterminals T1-TN, feeder link antennas 110-116 and a gateway processor 120. A network 130 (that may be a wireline and/or wireless network) is also illustrated as being connected to the satellite communications system 100 and may be part of the satellite communications system 100. The radioterminals T1-TN can communicate (through the satellite 102 and feeder link antennas 110-116) with one another and/or with other communications devices that are connected to the network 130. The satellite 102 receives information from the radioterminals T1-TN through return service links, and transmits the information to the feeder link antennas 110-116 through return feeder links. The satellite 102 receives information from the feeder link antennas 110-116 through forward feeder links, and transmits the information to the radioterminals T1-TN through forward service links. In some cases, such as, for example, in broadcasting, a single forward service link of the satellite may communicate information to more than one of the radioterminals T1-TN. The forward feeder links and the return feeder links each use one or more feeder link carriers and/or channels of a feeder link band of frequencies.

To provide a relatively high aggregate signal spectrum from the satellite 102 to one or more satellite gateways (for processing such as, for example, ground-based beam forming), the satellite 102 can be configured to form return feeder link spot beams (antenna patterns) that are aligned with different ones of a plurality of feeder link antennas (i.e., gateway antennas), such as the feeder link antennas 110-116, and can thereby "spatially multiplex" the return service link aggregate spectrum across the return feeder link spot beams to the feeder link antennas 110-116, thereby spatially reusing an available feeder link bandwidth. For example, when the satellite 102 is configured to provide to one or more satellite gateways an aggregate signal spectrum corresponding to, for example, 100 return service link antenna feed elements (of the satellite return service link antenna) with each return service link antenna feed element providing, for example, 20 MHz of spectrum, the satellite 102 must be configured to provide an aggregate of 2 GHz (i.e., 20×100 MHz) of return feeder link spectrum to one or more gateways via one or more respective feeder link antennas, such as, for example, feeder link antennas 110-116, illustrated in FIG. 1. The satellite 102 may be configured to provide the 2 GHz aggregate spectrum while using only a 500 MHz feeder link bandwidth by forming four feeder link spot beams that are aligned with different ones of the four feeder link antennas 110-116, as illustrated in FIG. 1. Because the four feeder link spot beams use the same frequencies within the 500 MHz feeder link spectrum, the feeder link antennas 110-116 must be sufficiently spaced apart geographically to prevent or reduce a level of interference therebetween.

The satellite 102 may also reduce the feeder link bandwidth that is needed to support return service links using the techniques described in U.S. Pat. No. 6,937,857 to the present inventor, entitled Systems And Methods For Reducing Satellite Feeder Link Bandwidth/Carriers In Cellular Satellite Systems, assigned to the assignee of the present application, the disclosure of which is hereby incorporated herein by reference in its entirety as if set forth fully herein. As described in the Abstract of this Patent Application Publication, information content is non-identically mapped between service link carriers and feeder link carriers at a satellite. A reduced number of feeder link carriers compared to the number of service link carriers and/or a reduced total bandwidth of the feeder link carriers compared to the service link carriers may thereby be obtained.

As used herein, the term "radioterminal" includes a cellular and/or satellite radioterminal with or without a multi-line display; Personal Communications System (PCS) terminals that may combine a radioterminal with voice, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or laptop and/or palmtop computers or other data processing devices, which include a radio frequency transceiver. A radioterminal also may be referred to herein as a "radiotelephone," a "mobile terminal," or simply as a "terminal". As used herein, the term(s) "radioterminal," "radiotelephone," "mobile terminal," and/or "terminal" also include(s) any other communications device, equipment and/or source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based component" or "space-based system" includes one or more satellites at any orbit (geostationary, substantially geostationary, substantially medium earth orbit, substantially low earth orbit, substantially elliptical earth orbit, etc.) and/or one or more other objects and/or platforms (e.g., airplanes, balloons, unmanned vehicles, space crafts, missiles, etc.) that has/have a trajectory above the earth at any altitude.

SUMMARY

Some embodiments of the present invention are directed to a satellite communications system that includes a plurality of feeder link antennas, that may be ground-based feeder link antennas, a primary satellite, and one or more auxiliary satellites. The feeder link antennas are substantially co-located relative to one another. The primary satellite is configured to receive information over a plurality of return service links from radioterminals, to communicate a first portion of the information over at least one return feeder link directly to a first one of the feeder link antennas, and to communicate a second portion of the information across at least one inter-satellite link. The auxiliary satellites are spaced apart and separate from the primary satellite and from one another, and configured to receive the second portion of the information from the primary satellite via the at least one inter-satellite link, and to communicate the second portion of the information over at least one return feeder link to at least one second feeder link antenna.

Accordingly, the primary satellite can distribute an aggregate signal spectrum (or aggregate signal bandwidth) associated with the return service links and/or the receive service link antenna feed elements of the primary satellite over the return feeder link(s) of the primary satellite to the first feeder link antenna and over the return feeder link(s) of the auxiliary satellite(s) to the at least one second feeder link antenna.

Some other embodiments of the present invention are directed to related methods of communicating in a satellite communications system, primary satellites, auxiliary satellites, and satellite communications equipment that may be, in some embodiments, ground-based satellite communications equipment. According to embodiments of the invention, the auxiliary satellite(s) may be devoid of any service link antennas that enable the auxiliary satellite(s) to communicate directly with radioterminals.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION

Specific exemplary embodiments of the invention now will be described with reference to the accompanying drawing. This invention may, however, be embodied in many different forms and should not be construed as limited to the embodiments set forth herein. Rather, these embodiments are provided so that this disclosure will be thorough and complete, and will fully convey the scope of the invention to those skilled in the art. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first radioterminal below could be termed a second radioterminal, and similarly, a second radioterminal may be termed a first radioterminal without departing from the teachings of the present invention. As used herein, the term "and/or" includes any and all combinations of one or more of the associated listed items. The symbol "/" is also used as a shorthand notation for "and/or".

Figure 1:
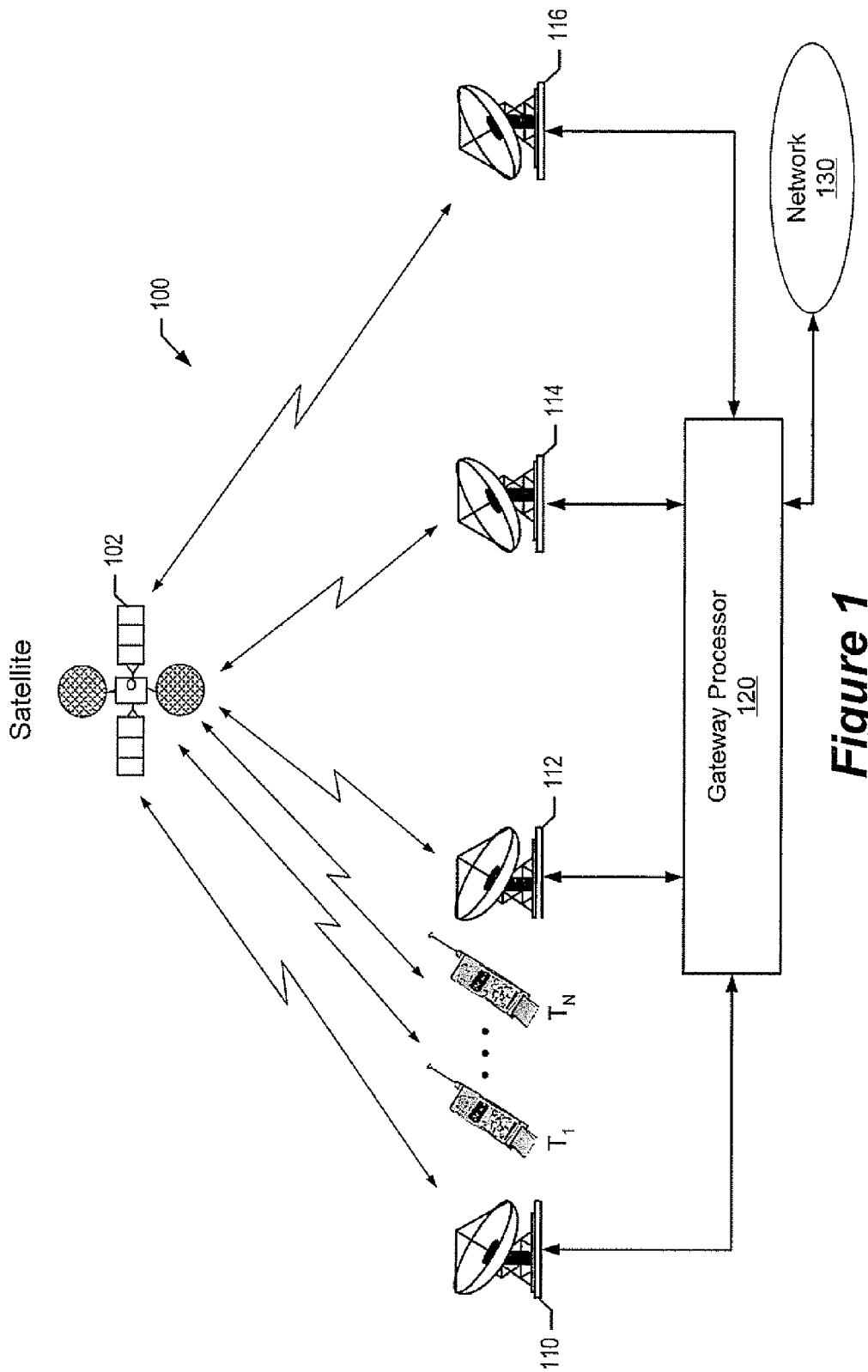
FIG. 1 is a schematic diagram illustrating a conventional satellite communications system in which a satellite relays information between radioterminals and a plurality of widely spaced apart feeder link antennas.

As was explained with regard to FIG. 1, a satellite can increase its return feeder link bandwidth by forming spot beams that are aligned with different ones of a plurality of widely spaced apart feeder link antennas. However, the need to establish and maintain geographic sites for the widely spaced apart feeder link antennas may represent additional expense and/or management burden for a satellite communications system operator. Accordingly, an alternate satellite communications system that allows a number of feeder link antenna sites to be reduced or minimized may be advantageous.

Figure 2:
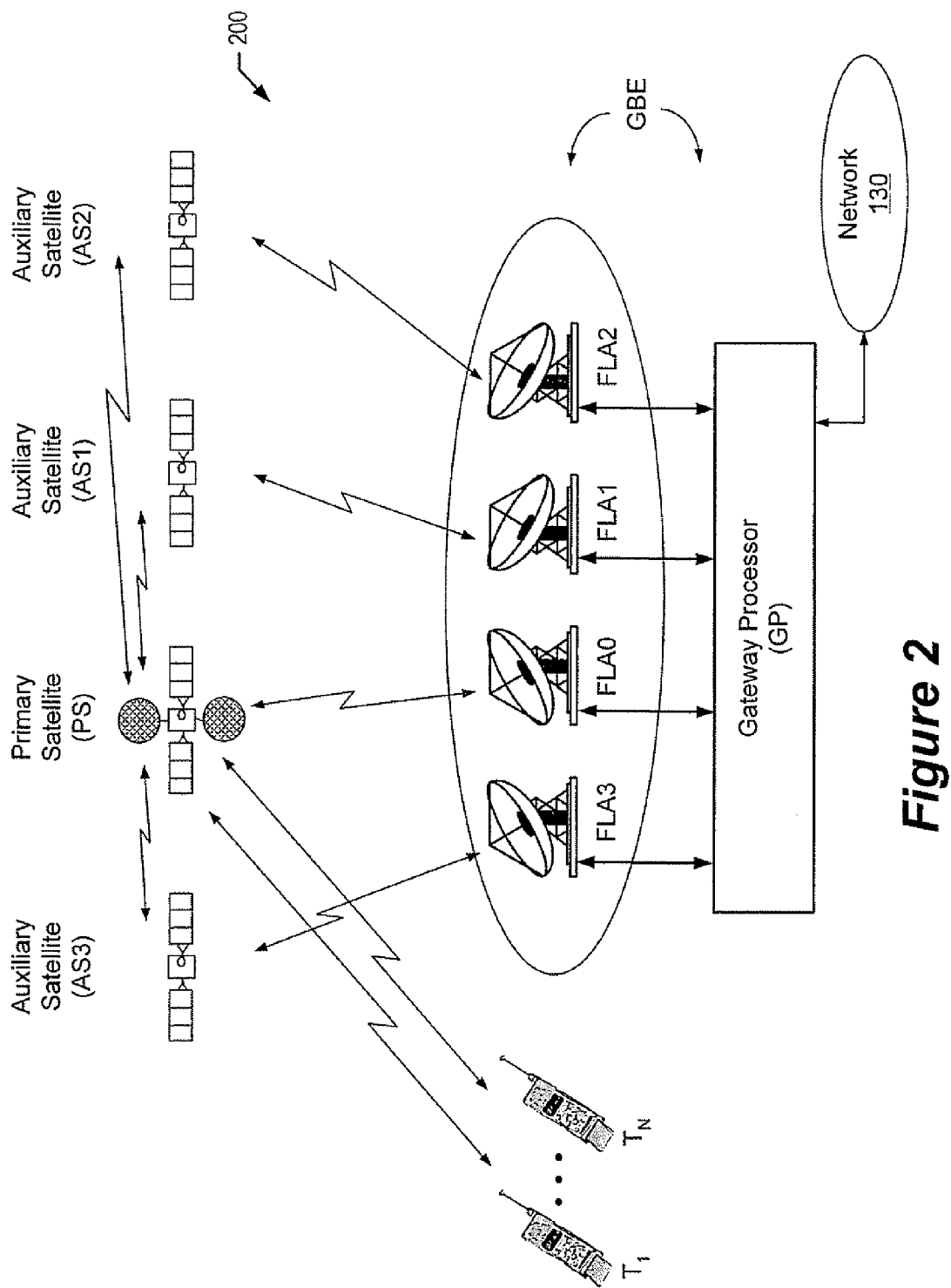
FIG. 2 is a schematic diagram illustrating a satellite communications system and methods in which a plurality of satellites relay information between radioterminals and a plurality of substantially geographically co-located feeder link antennas according to various embodiments of the present invention.

FIG. 2 is a schematic diagram that illustrates a satellite communications system 200 and methods in accordance with some embodiments of the present invention. The satellite communications system 200 includes a Primary Satellite ("PS"), a plurality (e.g., three) of Auxiliary Satellites ("ASs"), a plurality (e.g., four) of Feeder Link Antennas ("FLAs"), a Gateway Processor ("GP"), a plurality of radioterminals T1-TN, and a network 130. The feeder link antennas FLA0-FLA3, the gateway processor GP, and the network 130 may be collectively referred to as Ground-Based Equipment ("GBE"). However, it will be understood that, according to some embodiments of the invention, the feeder link antennas FLA0-FLA3, the gateway processor GP and/or the network 130 may not be ground-based (e.g., any combination thereof may be maritime-based, aeronautically-based and/or space-based). In accordance with embodiments of the invention, the network 130 (that may be a wireline and/or wireless network), illustrated as being connected to the satellite communications system 100, may or may not be part of the satellite communications system 100. The radioterminals T1-TN may be configured to communicate with the primary satellite PS by radiating substantially linearly-polarized electro-magnetic energy and/or arbitrarily-polarized electro-magnetic energy and the primary satellite PS may, in accordance with some embodiments of the invention, be configured to receive both substantially Left Hand Circularly Polarized (LHCP) electro-magnetic energy and substantially Right Hand Circularly Polarized (RHCP) electro-magnetic energy that arrives at the primary satellite PS over service link frequencies. Service link frequencies may be frequencies of an L-band, S-band and/or any other band of frequencies that may be used to provide service link communications. The primary satellite PS may be configured to transmit information to the radioterminals T1-TN by radiating substantially LHCP and/or RHCP electro-magnetic energy.

As illustrated in FIG. 2, each of the auxiliary satellites AS1-AS3 is spaced apart from the primary satellite PS and from other ones of the auxiliary satellites AS1-AS3 by an amount that allows the feeder link antennas FLA0-FLA3, (that may be at or near the Earth), to be substantially co-located relative to one another while providing substantial discrimination/isolation therebetween in receiving/transmitting signals from/to the primary satellite PS and the auxiliary satellites AS1-AS3. For example, the feeder link antenna FLA0 that communicates with the primary satellite PS may be oriented and configured to provide a substantially higher (or maximum) gain in a direction associated with the primary satellite PS while providing a substantially lower gain in other directions including directions associated with the auxiliary satellites AS1-AS3. The feeder link antenna FLA1 that communicates with the auxiliary satellite AS1 may be oriented and configured to provide a substantially higher gain in a direction associated with the auxiliary satellite AS1 while providing a substantially lower gain in other directions including directions associated with the other auxiliary satellites AS2-AS3 and the primary satellite PS. The feeder link antenna FLA2 that communicates with the auxiliary satellite AS2 may be oriented and configured to provide a substantially higher gain in a direction associated with the auxiliary satellite AS2 while providing a substantially lower gain in other directions including directions associated with the other auxiliary satellites AS1 and AS3 and with the primary satellite PS. The feeder link antenna FLA3 that communicates with the auxiliary satellite AS3 may be oriented and configured to provide a substantially higher gain in a direction associated with the auxiliary satellite AS3 while providing a substantially lower gain in other directions including directions associated with the other auxiliary satellites AS2 and AS3 and with the primary satellite PS.

In some embodiments, both the primary satellite PS and the auxiliary satellites AS1-AS3 are in respective substantially geostationary orbits relative to Earth, and have at least about a 2° separation angle therebetween. In some other embodiments, a separation distance between the primary satellite PS and at least one of the auxiliary satellites AS1-AS3 and/or a separation distance between any two of the auxiliary satellites AS1-AS3, may be less or more than 2°. This separation distance can allow the substantially co-located feeder link antennas to provide a level of discrimination between the received/transmitted feeder link signals from/to the primary satellite PS and/or the auxiliary satellites AS1-AS3.

As used herein, "substantially co-located" feeder link antennas means that a distance between the feeder link antennas is not dictated by directional feeder link beams (antenna patterns) that are formed by a single satellite. Accordingly, the feeder link antennas FLA0-FLA3 can be spaced apart by any distance that is convenient to the satellite communications system operator, and may be spaced apart by about 30 meters or less, by about 300 meters or less, by about 3000 meters or less, or by any other distance based on the geographic site selection and management convenience of the operator. Thus, for example, an operator may mount the feeder link antennas FLA0-FLA3 within one or more acres of land which the operator may conveniently purchase/lease.

Figure 3:
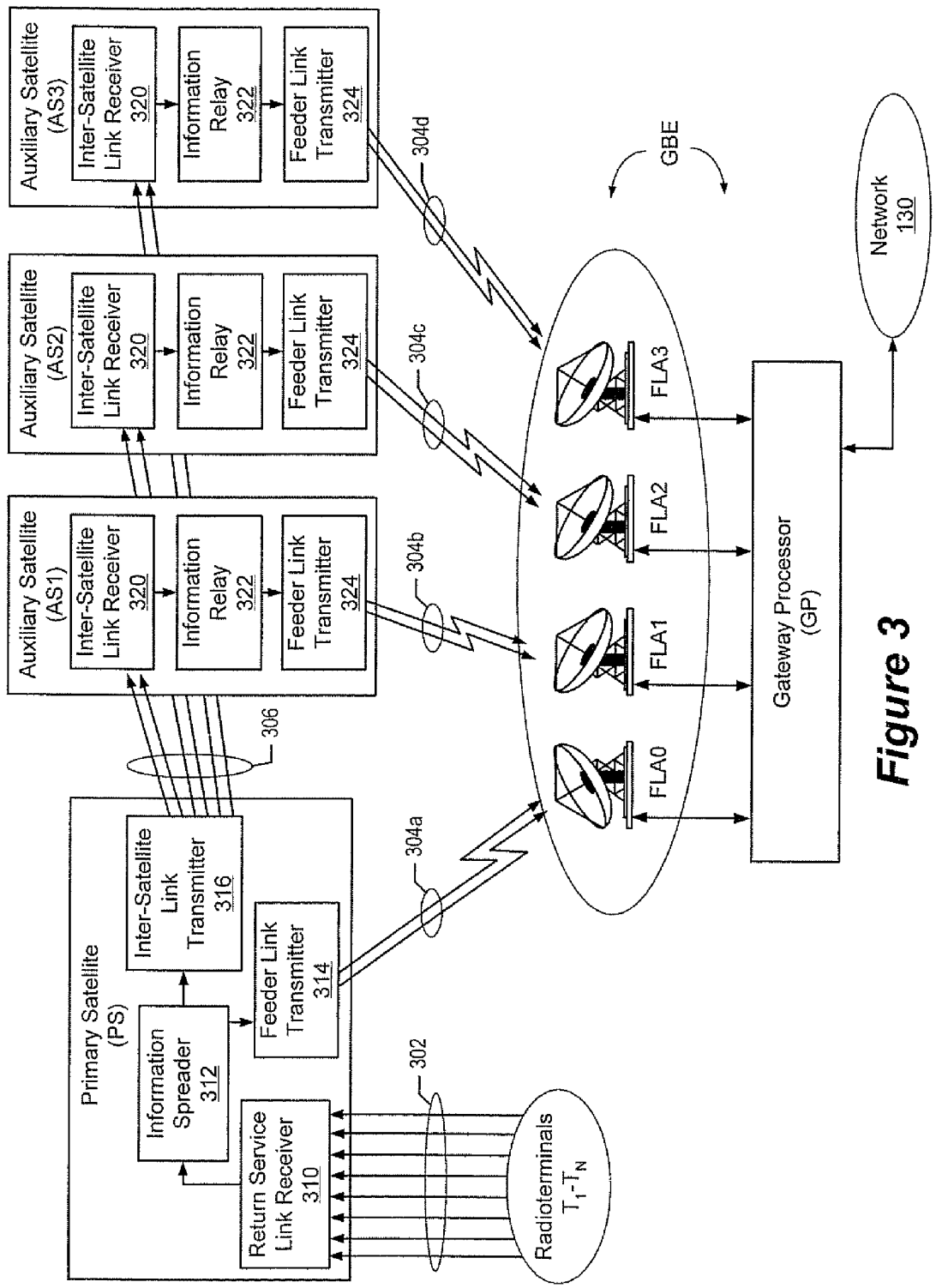
FIG. 3 is a more detailed block diagram of the satellite communications system and methods of FIG. 2 for communicating information from the radioterminals through a primary satellite and a plurality of auxiliary satellites to the feeder link antennas according to various embodiments of the present invention.

FIG. 3 is a more detailed block diagram of the satellite communications system 200 and methods of FIG. 2 for communicating information from the radioterminals T1-TN through the primary satellite PS and the auxiliary satellites AS1-AS3 to the feeder link antennas FLA1-3 according to various embodiments of the present invention. The primary satellite PS is configured to receive return link information from the radioterminals T1-TN through a plurality of return service links, and to transmit forward link information to the radioterminals T1-TN through a plurality of forward service links. The primary satellite PS transmits a portion of the return link information it receives from the radioterminals T1-TN directly to the feeder link antenna FLA0 through a return feeder link. The primary satellite PS also transmits another portion of the return link information to the auxiliary satellites AS1-AS3 through inter-satellite links. The auxiliary satellites AS1-AS3 transmit the received return link information through return feeder links to the associated feeder link antennas FLA1-FLA3.

Accordingly, the primary satellite PS distributes an aggregate signal spectrum (i.e., signal bandwidth) associated with the return service links on the return feeder link from the primary satellite PS to the feeder link antenna FLA0 and on the return feeder links from the auxiliary satellites AS1-AS3 to the respective feeder link antennas FLA1-FLA3. For example, when an aggregate bandwidth associated with the return service links 302 yields 2 GHz of aggregate signal spectrum that must be transported from space to one or more satellite gateways (as may be the case, in some embodiments, in order to perform satellite antenna pattern forming at the one or more satellite gateways), the primary satellite PS may route 500 MHz of the aggregate signal spectrum through the return feeder link(s) 304a and route another 500 MHz of the aggregate signal spectrum to each of the auxiliary satellites AS1-3 to be transported through their respective return feeder links 304b-d, and so that the return feeder links 304a-d each carry about one fourth of the aggregate signal spectrum that is associated with the return service links 302.

For example, as illustrated in FIG. 3, the primary satellite can include a return service link receiver 310, an information spreader 312, a feeder link transmitter 314, and an inter-satellite link transmitter 316. The return service link receiver 310 receives information from the radioterminals T1-TN across return service links 302, eight of which have been illustrated. The feeder link transmitter 314 transmits information across return feeder link(s) 304a to the feeder link antenna FLA0. The inter-satellite link transmitter 316 transmits information across inter-satellite link(s) 306 to selected ones of the auxiliary satellites AS1-AS3. The inter-satellite link(s) 306 may be Radio Frequency (RF) links, optical links and/or other types of wireless communications links.

The information spreader 312 distributes information associated with the return service links 302 across the return feeder link(s) 304a from the primary satellite PS to the feeder link antenna FLA0 and across the inter-satellite link(s) 306 from the primary satellite PS to the auxiliary satellites AS1-AS3. For example, the information spreader 312 may route information associated with a first set of receive antenna feed elements and/or first set of frequencies of a receive service link antenna of the primary satellite PS to the feeder link transmitter 314 for transmission to the feeder link antenna FLA0, route information associated with a second set of receive antenna feed elements and/or second set of frequencies of the receive service link antenna of the primary satellite PS to the inter-satellite link transmitter 316 for transmission to the auxiliary satellite AS1, route information associated with a third set of receive antenna feed elements and/or third set of frequencies of the receive service link antenna of the primary satellite PS to the inter-satellite link transmitter 316 for transmission to the auxiliary satellite AS2, and route information associated with a fourth set of receive antenna feed elements and/or fourth set of frequencies of the receive service link antenna of the primary satellite PS to the inter-satellite link transmitter 316 for transmission to the auxiliary satellite AS3.

The auxiliary satellites AS1-AS3 may each include an inter-satellite link receiver 320, an information relay 322, and a feeder link transmitter 324. The inter-satellite link receiver 320 receives information from the primary satellite PS across the inter-satellite links 306. The information relay 322 relays the received information, and may relay the received information substantially unchanged or add content, to the feeder link transmitter 324. The feeder link transmitter 324 transmits the information from relay 322 through an associated one of the feeder links 304b-d to an associated one of the feeder link antennas FLA1-FLA3. Because the auxiliary satellites AS1-3 may be configured to serve primarily as information relays between the primary satellite PS and the feeder link antennas FLA1-3, they need not provide substantial on-board processing and, thereby, may be relatively simple and/or compact compared to the primary satellite PS. Furthermore, the auxiliary satellites AS1-3 may be devoid of any service link antennas and may, therefore, be incapable of communicating directly with radioterminals. However, in some embodiments, one or more of the auxiliary satellites may be equipped with one or more service link antennas. Accordingly, it may be more efficient, less expensive and/or otherwise desirable to use a plurality of auxiliary satellites, according to embodiments of the present invention, rather than providing multiple, widely spaced apart, feeder link antennas as shown in FIG. 1.

The feeder link transmitter 314 of the primary satellite PS and the feeder link transmitter 324 of each of the auxiliary satellites AS1-AS3 may use at least some of the same frequencies for the return feeder links 304a-d. Although the feeder link antennas FLA0-FLA3 are substantially geographically co-located, they can each discriminate/isolate among the feeder links 304a-d from a particular one of the auxiliary satellites AS1-AS3 or primary satellite PS with an acceptable level of interference because of the separation between any two of the primary satellite PS and the auxiliary satellites AS1-AS3.

The information spreader 312 may be configured to perform a static or dynamic routing of information associated with return service link antenna feed elements of the return service link antenna(s) of the primary satellite PS to return feeder links 304a-d. The information spreader 312 may dynamically vary the mapping in response to, for example, a utilization of the return service links 302 by the radioterminals T1-TN. For example, the information spreader 312 may increase a bandwidth utilization of the return feeder links 304b-d from the auxiliary satellites AS1-AS3 to the feeder link antennas FLA1-3 as the utilization of the return service links 302 increases, such as by offloading traffic to the auxiliary satellites AS1-3 as the primary satellite PS return feeder link(s) 304a reach a threshold bandwidth utilization. The information spreader 312 may alternatively, or additionally, map information associated with the return service links 302 among the return feeder links 304a-d to obtain a balancing of bandwidth utilization or other desired bandwidth utilization characteristics.

The information spreader 312 may process information that is received from a plurality of the return service links 302, such as by interleaving the information, and may spread that information for transmission across a plurality, or all, of the return feeder links 304a-d. Interleaving the information across a plurality of the return feeder links 304a-d may increase a robustness measure associated with the return feeder links 304a-d. For example, by spreading information received from one of the return service links 302 and/or return service link antenna feed elements of the return service link antenna(s) of the primary satellite PS across all of the return feeder links 304a-d may allow the gateway processor GP, or other portion of the ground based equipment GBE, to reduce errors introduced by interference to one of the return feeder links 304a-d.

Figure 4:
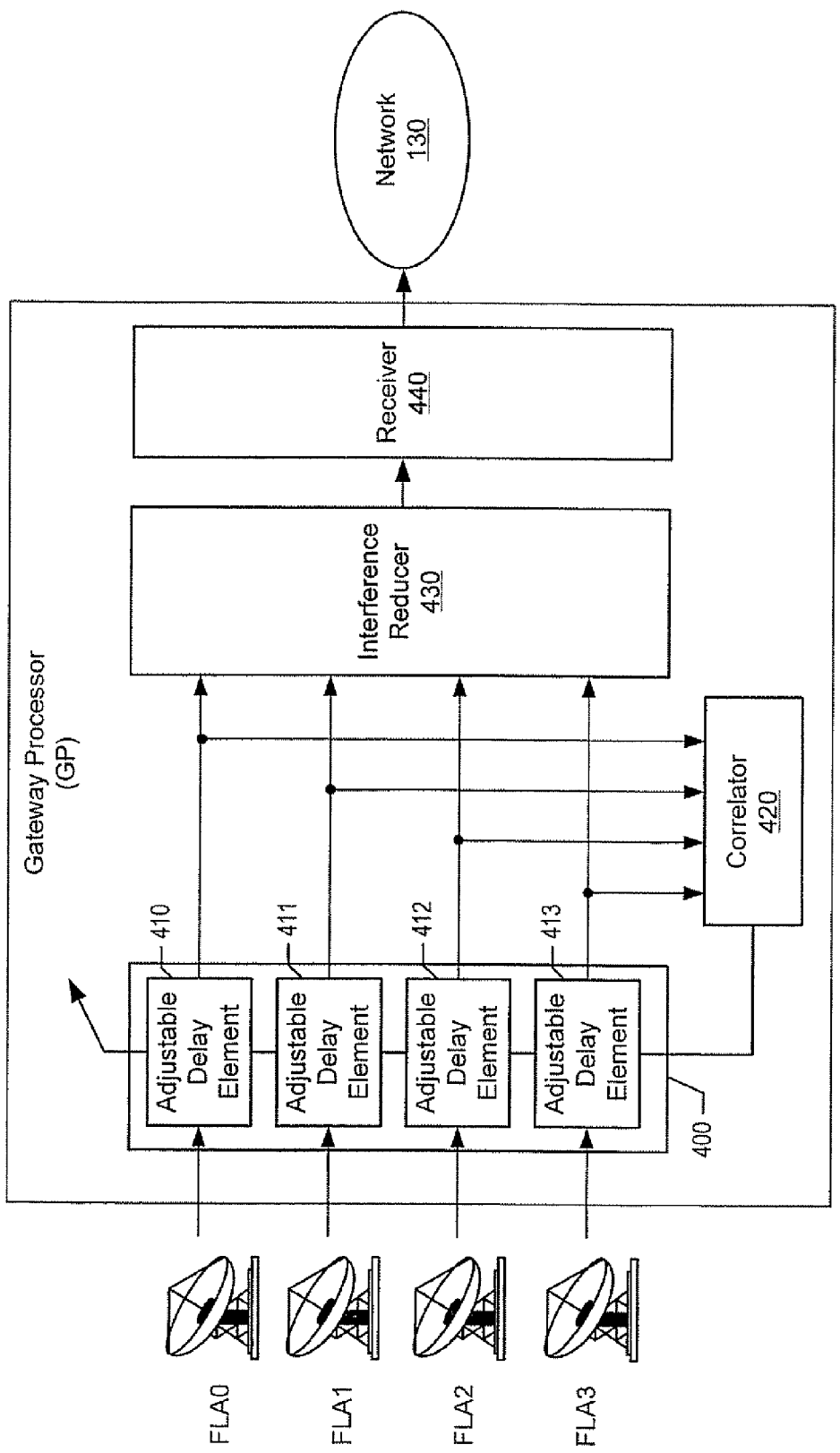
FIG. 4 is a more detailed block diagram of the gateway processor and methods of FIG. 2 for reducing interference in the feeder link signals.

The gateway processor GP processes the return feeder link signals 304a-d from the feeder link antennas FLA0-FLA3 to extract the information from the radioterminals T1-TN. FIG. 4 is a block diagram of the gateway processor and methods of FIG. 2 for reducing interference in the return feeder link signals from the feeder link antennas FLA0-FLA3 according to some embodiments of the present invention. The gateway processor GP may include a delay circuit 400, a correlator 420, an interference reducer 430, and a receiver 440. The delay circuit 400 may include a plurality (e.g., four) of adjustable delay elements 410-413, with each configured to delay a return feeder link signal from an associated one of the feeder link antennas FLA0-FLA3 by an amount that is controlled by the correlator 420. The correlator 420 correlates output signals of the adjustable delay elements 410-413 to determine timing offset(s) therebetween, and varies the delays caused by each of the adjustable delay elements 410-413 to time align the return feeder link signals. It will be understood that in accordance with some embodiments of the invention, the delay circuit 400 (or at least some of the delay elements 410-413) may not be required. For example, subject to a sufficiently compact co-location of the feeder link antennas FLA0-FLA3, the delay circuit 400 (or at least some of the delay elements 410-413) may not be required.

The interference reducer 430 generates interference correction signal(s) from the time aligned return feeder link signals that is indicative of interference caused by the return feeder link(s) 304a from the primary satellite PS to one or more of the return feeder links 304b-d received by the feeder link antennas FLA1-FLA3, and/or that is indicative of interference caused by one or more of the return feeder links 304b-d from the auxiliary satellites AS1-AS3 to the return feeder link(s) 304a received by the feeder link antennas FLA0. The interference reducer 430 also uses the interference correction signal(s) to reduce interference in at least one of the return feeder link signals from the feeder link antennas FLA0-FLA3. The receiver 440 can further process the return feeder link signals, including error correction decoding, to extract the information from the radioterminals T1-TN, and can communicate the extracted information to the network 130 to allow the radioterminals T1-TN to communicate with one another and/or with other communications devices that are connected to the network 130.

The gateway processor GP may carry out interference reduction using techniques described in provisional patent application Ser. No. 60/662,053, entitled Intra-System and/or Inter-System Reuse of Feeder Link Frequencies Including Interference Suppression Systems and Methods, filed Mar. 15, 2005, the disclosure of which is hereby incorporated herein by reference in its entirety as if set forth fully herein.

Figure 5:
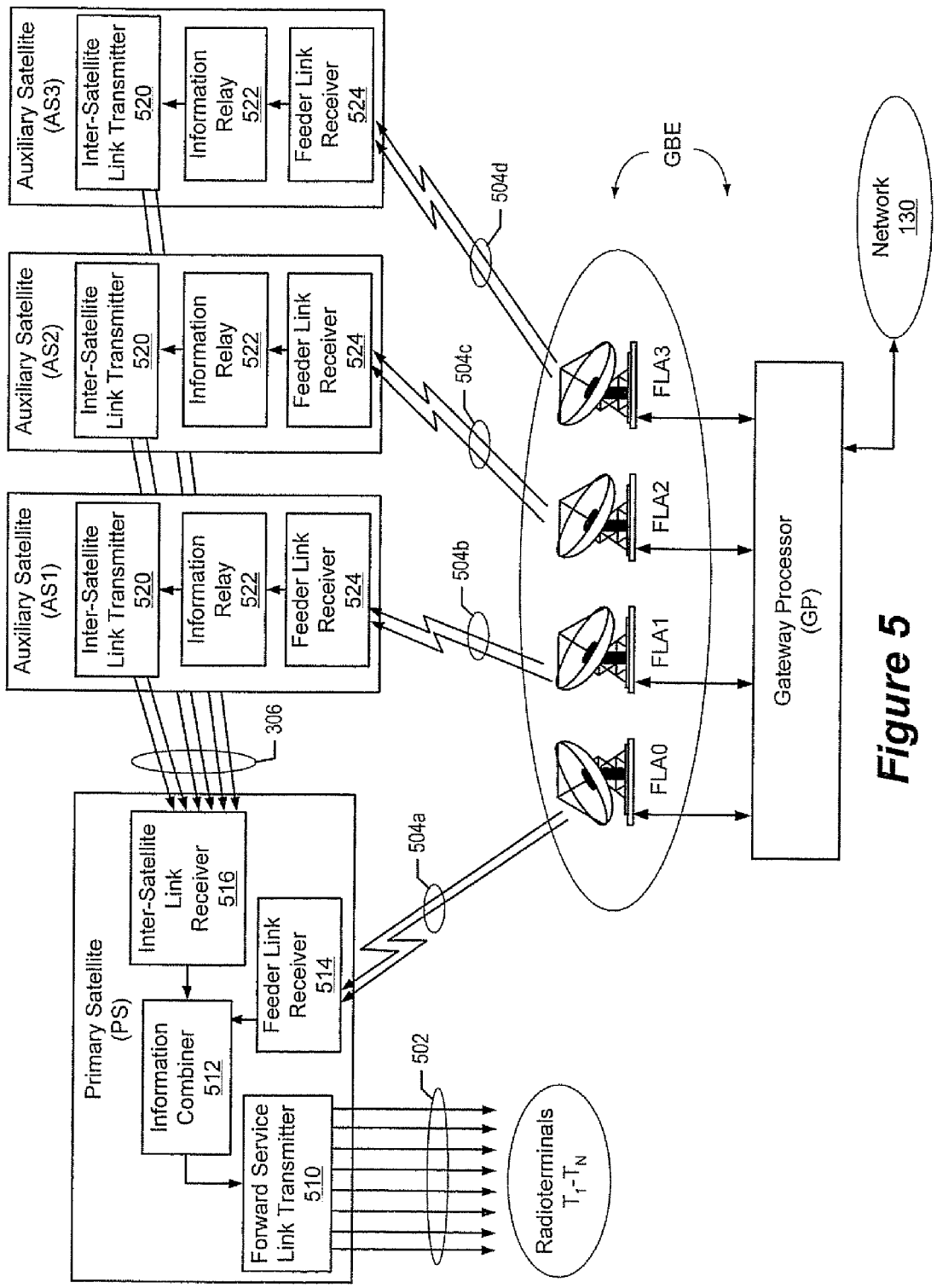
FIG. 5 is a more detailed block diagram of the satellite communications system and methods of FIG. 2 for communicating information from the feeder link antennas through the primary satellite and the auxiliary satellites to the radioterminals according to various embodiments of the present invention.

FIG. 5 is a more detailed block diagram of the satellite communications system and methods of FIG. 2 for communicating information from the feeder link antennas FLA0-FLA3 through the primary satellite PS and the auxiliary satellites AS1-AS3 to the radioterminals T1-TN according to various embodiments of the present invention. Information that is to be communicated from the ground based equipment GBE to the radioterminals T1-TN can be communicated directly to the primary satellite PS through forward feeder links 504a and indirectly to the primary satellite PS via the auxiliary satellites AS1-AS3. The primary satellite PS can then retransmit information to the radioterminals T1-TN through a plurality of forward service links 502. Accordingly, the primary satellite PS can utilize/process forward feeder link signals of each of the forward feeder links 504a-d to the primary satellite PS and auxiliary satellites AS1-AS3 to form an aggregate signal to serve the forward service links 502 associated with radioterminals T1-TN.

Each of the auxiliary satellites AS1-AS3 can include an inter-satellite link transmitter 520, an information relay 522, and a feeder link receiver 524. The feeder link receiver 524 receives information from one of the feeder link antennas FLA1, FLA2, FLA3 through one or more forward feeder links 504b, 504c, 504d, respectively. The information relay 522 relays the received information, and may relay the received information substantially unchanged or modified/re-formatted, to the inter-satellite link transmitter 520. The inter-satellite link transmitter 520 transmits the information across the inter-satellite links 306 to the primary satellite PS.

The primary satellite PS can include a forward service link transmitter 510, an information combiner 512, a feeder link receiver 514, and an inter-satellite link receiver 516. The feeder link receiver 514 receives information directly from the feeder link antenna FLA0 through one or more forward feeder links 504a. The inter-satellite link receiver 516 receives information transmitted by the auxiliary satellites AS1-AS3 through the inter-satellite links 306. The information combiner 512 routes the received information through selected ones of the forward service links 502 to the radioterminals T1-TN.

Although some embodiments of the present invention have been described in the context of a primary satellite that communicates through four auxiliary satellites to ground based equipment, it is to be understood that one or more primary and/or auxiliary satellites may be used according to various embodiments of the present invention. The number of auxiliary satellites may be selected based on a total aggregate bandwidth that is be supported by the service links between the primary satellite(s) and radioterminals and/or based on a total aggregate bandwidth that is allocated to the primary satellite(s) for return/forward feeder link communications. The auxiliary satellite(s) may not include forward and/or return service link antennas, thus reducing complexity, size, mass and/or cost associated with the auxiliary satellite(s), and may thus not be able to communicate directly with radioterminals.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A satellite communications system comprising:
a plurality of feeder link antennas that are substantially co-located therebetween and are connected to a same gateway processor;
a primary satellite that is configured to receive information from radioterminals through a plurality of return service links, to communicate a first portion of the information over at least one return feeder link to a first one of the feeder link antennas, and to communicate another second portion of the information over at least one inter-satellite link; and
an auxiliary satellite that is spaced apart from the primary satellite, and configured to receive the second portion of the information from the primary satellite via the at least one inter-satellite link, and to communicate the second portion of the information over at least one return feeder link to a second one of the feeder link antennas,
wherein the primary satellite is further configured to distribute an aggregate of signal spectrum associated with the return service links across a combination of signal spectrum of the at least one return feeder link to the first one of the feeder link antennas and, via the inter-satellite link, signal spectrum of the at least one return feeder link from the auxiliary satellite to the second one of the feeder link antennas.

2. The satellite communications system of claim 1, wherein the primary satellite uses a first set of frequencies to communicate with the first one of the feeder link antennas and the auxiliary satellite uses a second set of frequencies to communicate with the second one of the feeder link antennas, wherein the first set of frequencies and the second set of frequencies include at least one common frequency.

3. The satellite communications system of claim 1, wherein the primary satellite and the auxiliary satellite are spaced apart therebetween to provide an antenna discrimination between the primary satellite and the second one of the feeder link antennas, and to provide an antenna discrimination between the auxiliary satellite and the first one of the feeder link antennas.

4. The satellite communications system of claim 3, wherein the primary satellite and the auxiliary satellite are located in respective substantially geostationary orbits relative to Earth, and have a separation angle therebetween of about 2° or more.

5. The satellite communications system of claim 1, wherein the auxiliary satellite is devoid of any configuration that allows the auxiliary satellite to communicate directly with radioterminals.

6. The satellite communications system of claim 1, wherein:

the first one of the feeder link antennas is configured to provide a substantially higher gain in a direction associated with the primary satellite and a substantially lower gain in a direction associated with the auxiliary satellite; and the second one of the feeder link antennas is configured to provide a substantially higher gain in a direction associated with the auxiliary satellite and a substantially lower gain in a direction associated with the primary satellite.

7. The satellite communications system of claim 6, further comprising a plurality of auxiliary satellites configured to receive portions of the information from the primary satellite via a plurality of inter-satellite links, and to communicate the portions of the information over a plurality of return feeder links to a plurality of feeder link antennas, wherein each feeder link antenna of the plurality of feeder link antennas, is configured to provide a substantially higher gain in a direction associated with a respective auxiliary satellite and a substantially lower gain in a direction associated with an auxiliary satellite other than the respective auxiliary satellite.

8. The satellite communications system of claim 7, wherein two feeder link antennas of the plurality of feeder link antennas are separated therebetween by about 3000 meters or less.

9. The satellite communications system of claim 8, wherein two feeder link antennas of the plurality of feeder link antennas are separated therebetween by about 300 meters or less.

10. The satellite communications system of claim 9, wherein two feeder link antennas of the plurality of feeder link antennas are spaced therebetween by about 30 meters or less.

11. The satellite communications system of claim 1, further comprising a plurality of auxiliary satellites, wherein the primary satellite is further configured to distribute the aggregate of signal spectrum associated with the return service links across a combination of signal spectrum of the at least one return feeder link to the first one of the feeder link antennas and signal spectrum of a plurality of return feeder links associated with the auxiliary satellites.

12. The satellite communications system of claim 11, wherein the primary satellite is further configured to control a bandwidth utilization of the return feeder link of the primary satellite and to control a bandwidth utilization of the plurality of return feeder links associated with the auxiliary satellites.

13. The satellite communications system of claim 1, wherein the auxiliary satellite is further configured to communicate the second portion of the information received from the primary satellite substantially unchanged to the second one of the feeder link antennas.

14. The satellite communications system of claim 1, wherein:

the auxiliary satellite is further configured to receive forward link information over at least one forward feeder link from the second one of the feeder link antennas, and to communicate the forward link information to the primary satellite over at least one inter-satellite link; and the primary satellite is further configured to communicate the forward link information to the radioterminals over a plurality of forward service links.

15. The satellite communications system of claim 1, wherein the primary satellite is further configured to receive first forward link information from the first one of the feeder link antennas and receive second forward link information from the second one of the feeder link antennas and to route the first and second forward link information through selected ones of a plurality forward service links to the radioterminals.

16. The satellite communications system of claim 1, further comprising a gateway processor that is configured to receive return feeder link signals from at least the first one of the feeder link antennas and the second one of the feeder link antennas, and to process the received return feeder link signals to reduce interference in at least one of the return feeder link signals.

17. The satellite communications system of claim 16, wherein the gateway processor is further configured to time align at least some of the return feeder link signals relative to one another, and to reduce interference in at least one of the return feeder link signals in response to the time aligned return feeder link signals.

18. The satellite communications system of claim 17, wherein the gateway processor is further configured to time align a return feeder link signal received from the first one of the feeder link antennas relative to a return feeder link signal received from the second one of the feeder link antennas, and to generate an interference correction signal from the time aligned return feeder link signals that is indicative of interference caused by at least one return feeder link from the primary satellite to at least one return feeder link received by the second one of the feeder link antennas.

19. The satellite communications system of claim 18, wherein the gateway processor is further configured to reduce interference in at least one return feeder link signal received from the second one of the feeder link antennas in response to the interference correction signal.

20. The satellite communications system of claim 17, wherein the gateway processor is further configured to time align a return feeder link signal received from the first one of the feeder link antennas relative to a return feeder link signal received from the second one of the feeder link antennas, and to generate an interference correction signal from the time aligned return feeder link signals that is indicative of interference caused by at least one return feeder link from the auxiliary satellite to at least one return feeder link received by the first one of the feeder link antennas.

21. A method of communicating in a satellite communications system, the method comprising:

receiving information at a primary satellite from radioterminals through a plurality of return service links;

communicating a first portion of the information from the primary satellite over at least one return feeder link to a first one of a plurality of feeder link antennas that are connected to a same gateway processor;

communicating another second portion of the information from the primary satellite over at least one inter-satellite link to an auxiliary satellite that is spaced apart from the primary satellite;

communicating the second portion of the information from the auxiliary satellite over at least one return feeder link to a second one of the feeder link antennas that is substantially co-located with the first one of the feeder link antennas, wherein communication of the first and second portions of the information is carried out to distribute an aggregate of signal spectrum associated with the return service links across a combination of signal spectrum of the at least one return feeder link to the first one of the feeder link antennas and, via the inter-satellite link, signal spectrum of the at least one return feeder link from the auxiliary satellite to the second one of the feeder link antennas.

22. The method of claim 21, further comprising using first feeder link frequencies to communicate information between the primary satellite and the first one of the feeder link antennas and second feeder link frequencies to communicate information between the auxiliary satellite and the second one of the feeder link antennas, wherein the first and second feeder link frequencies comprise at least one common frequency.

23. The method of claim 21, further comprising maintaining a distance between the primary satellite and the auxiliary satellite to provide a discrimination between the primary satellite and the second one of the feeder link antennas, and to provide a discrimination between the auxiliary satellite and the first one of the feeder link antennas.

24. The method of claim 23, further comprising maintaining the primary satellite and the auxiliary satellite in respective substantially geostationary orbits relative to Earth with about a 2° or more separation angle therebetween.

25. The method of claim 21, wherein communicating a second portion of the information from the primary satellite over at least one inter-satellite link to an auxiliary satellite comprises communicating the second portion of the information from the primary satellite over at least one inter-satellite link to an auxiliary satellite that is devoid of any configuration that allows the auxiliary satellite to communicate directly with radioterminals.

26. The method of claim 21, further comprising:
configuring the first one of the feeder link antennas to provide a substantially higher gain in a direction associated with the primary satellite and a substantially lower gain in a direction associated with the auxiliary satellite; and
configuring the second one of the feeder link antennas to provide a substantially higher gain in a direction associated with the auxiliary satellite and a substantially lower gain in a direction associated with the primary satellite.

27. The method of claim 26, further comprising:
communicating portions of the information received at the primary satellite from radioterminals over a plurality of the inter-satellite links to a plurality of auxiliary satellites;
communicating the portions of the information over a plurality of return feeder links from the plurality of auxiliary satellites to a respective plurality of feeder link antennas that are substantially co-located therebetween; and
configuring each feeder link antenna of the plurality of feeder link antennas to provide a substantially higher gain in a direction associated with a respective auxiliary satellite and to provide a substantially lower gain in a direction associated with an auxiliary satellite other than the respective auxiliary satellite.

28. The method of claim 21, further comprising distributing an aggregate information over the at least one return feeder link of the primary satellite and over a plurality of return feeder links associated with a plurality of auxiliary satellites.

29. The method of claim 28, further comprising controlling a bandwidth utilization of the at least one return feeder link of the primary satellite and controlling a bandwidth utilization of the plurality of return feeder links of the auxiliary satellites.

30. The method of claim 21, wherein communicating the second portion of the information from the auxiliary satellite over at least one return feeder link to a second one of the feeder link antennas that is substantially co-located with the first one of the feeder link antennas comprises:
communicating the second portion of the information received by the auxiliary satellite from the primary satellite substantially unchanged to the second one of the feeder link antennas.

31. The method of claim 21, further comprising:
receiving forward link information at the auxiliary satellite through at least one forward feeder link from the second one of the feeder link antennas;
communicating the forward link information over at least one inter-satellite link to the primary satellite; and
communicating the forward link information from the primary satellite to the radioterminals over a plurality of forward service links.

32. The method of claim 21, further comprising:
receiving at the primary satellite first forward link information from the first one of the feeder link antennas;
receiving at the primary satellite second forward link information from the second one of the feeder link antennas; and
routing the first and second forward link information from the primary satellite through selected ones of a plurality forward service links to the radioterminals.

33. The method of claim 21, further comprising:
receiving return feeder link signals at a gateway processor from at least the first one of the feeder link antennas and the second one of the feeder link antennas; and
processing the received return feeder link signals at the gateway processor to reduce interference in at least one of the return feeder link signals.

34. The method of claim 33, further comprising:
time aligning at least some of the return feeder link signals relative to one another; and
reducing interference in at least one of the return feeder link signals in response to the time aligned return feeder link signals.

35. The method of claim 34, wherein time aligning at least some of the return feeder link signals relative to one another comprises:
time aligning at least one return feeder link signal received from the first one of the feeder link antennas relative to at least one return feeder link signal received from the second one of the feeder link antennas; and
generating an interference correction signal from the time aligned return feeder link signals that is indicative of interference caused by the at least one return feeder link from the primary satellite to the at least one return feeder link received by the second one of the feeder link antennas.

36. The method of claim 35, wherein processing the received return feeder link signals at the gateway processor to reduce interference in at least one of the return feeder link signals comprises:
reducing interference in the at least one received return feeder link signal from the second one of the feeder link antennas in response to the interference correction signal.

37. The method of claim 34, wherein time aligning at least some of the received return feeder link signals relative to one another comprises:
time aligning the at least one return feeder link signal provided by the first one of the feeder link antennas relative to the at least one return feeder link signal provided by the second one of the feeder link antennas; and
generating an interference correction signal from the time aligned return feeder link signals that is indicative of interference caused by the at least one return feeder link from the auxiliary satellite to the at least one return feeder link received by the first one of the feeder link antennas.

38. A primary satellite comprising:
a return service link receiver that is configured to receive information over a plurality of return service links from radioterminals;
an information spreader that is configured to distribute the information into at least a first portion and another second portion;
a feeder link transmitter that is configured to transmit the first portion of the information over at least one return feeder link directly to a first one of a plurality of feeder link antennas that are connected to a same gateway processor; and
an inter-satellite link transmitter that is configured to transmit the second portion of the information over at least one inter-satellite link to an auxiliary satellite for transmission over at least one return feeder link to a second one of the feeder link antennas that is substantially co-located relative to the first one of the feeder link antennas and that is connected to the same gateway processor as the first one of the feeder link antennas,
wherein the information spreader is further configured to distribute an aggregate of signal spectrum associated with the return service links across a combination of signal spectrum of the at least one return feeder link to the first one of the feeder link antennas and, via the inter-satellite link, signal spectrum of the at least one return feeder link from the auxiliary satellite to the second one of the feeder link antennas.

39. The primary satellite of claim 38, further comprising:
a feeder link receiver that is configured to receive forward link information directly from the first one of the feeder link antennas over at least one forward feeder link;
an inter-satellite link receiver that is configured to receive forward link information over the at least one inter-satellite link from the second one of the feeder link antennas indirectly via the auxiliary satellite; and
a forward service link transmitter that is configured to transmit an aggregate of the forward link information received by the feeder link receiver and the inter-satellite link receiver over a plurality of forward service links to the radioterminals.

40. The primary satellite of claim 39, further comprising an information combiner configured to aggregate a signal associated with at least one forward feeder link from the first one of the feeder link antennas with a signal associated with at least one inter-satellite link from the auxiliary satellite.

41. The primary satellite of claim 38, wherein the feeder link transmitter is configured to transmit the information to the first one of the feeder link antennas using at least some of the same frequencies as are used by the auxiliary satellite to transmit to the second one of the feeder link antennas.

42. An auxiliary satellite comprising:
an inter-satellite link receiver that is configured to receive information over at least one inter-satellite link from a primary satellite that received the information from radioterminals through a plurality of return service links; and
a feeder link transmitter that is configured to transmit the information over at least one return feeder link directly to a first one of a plurality of feeder link antennas that is substantially co-located relative to a second one of the plurality of feeder link antennas that the primary satellite is transmitting to directly over at least one return feeder link to distribute an aggregate of signal spectrum associated with the return service links across a combination of signal spectrum of the at least one return feeder link to the first one of the feeder link antennas and signal spectrum of the at least one return feeder link from the primary satellite to the second one of the feeder link antennas,
wherein the first and second feeder link antennas are connected to a same gateway processor.

43. The auxiliary satellite of claim 42, wherein the feeder link transmitter is configured to transmit the information to the first one of the feeder link antennas using at least some of the same frequencies as are used by the primary satellite to transmit to the second one of the feeder link antennas.

44. The auxiliary satellite of claim 42, further comprising:
a feeder link receiver that is configured to receive forward link information directly from the first one of the feeder link antennas over at least one forward feeder link; and
an inter-satellite link transmitter that is configured to transmit the forward link information over at least one inter-satellite link to the primary satellite for transmission over a plurality of forward service links to the plurality of radioterminals.

45. Satellite communications equipment comprising:
a plurality of feeder link antennas that are substantially co-located therebetween, are connected to a same gateway processor, and are configured to transmit and/or receive information over feeder links to a primary satellite and to at least one auxiliary satellite, wherein a first one of the feeder link antennas is configured to provide a substantially higher gain in a direction associated with the primary satellite and a substantially lower gain in a direction associated with the at least one auxiliary satellite, and a second one of the feeder link antennas is configured to provide a substantially higher gain in a direction associated with one of the at least one auxiliary satellite and a substantially lower gain in a direction associated with the primary satellite; and
a gateway processor that is configured to distribute information that is directed to a plurality of radioterminals simultaneously over at least one forward feeder link to the primary satellite and over at least one forward feeder link to the at least one auxiliary satellite for subsequent aggregation of the information at the primary satellite and retransmission of the information by the primary satellite to the radioterminals over a plurality of forward service links to distribute an aggregate of signal spectrum of the plurality of forward service links across a combination of the signal spectrum of the at least one forward feeder link to the primary satellite and the at least one forward feeder link to the at least one auxiliary satellite.

46. The satellite communications equipment of claim 45, wherein the first one of the feeder link antennas and second one of the feeder link antennas are each configured to use at least some common frequencies to communicate with the primary satellite and the at least one auxiliary satellite.

47. The satellite communications equipment of claim 45, wherein the first one of the feeder link antennas and second one of the feeder link antennas are configured to provide maximum gain in respective directions associated with the primary satellite and the at least one auxiliary satellite.

48. The satellite communications equipment of claim 45, wherein two feeder link antennas of the plurality of feeder link antennas are separated therebetween by about 3000 meters or less.

49. The satellite communications equipment of claim 48, wherein two feeder link antennas of the plurality of feeder link antennas are separated therebetween by about 300 meters or less.

50. The satellite communications equipment of claim 49, wherein two feeder link antennas of the plurality of feeder link antennas are separated therebetween by about 30 meters or less.

51. The satellite communications equipment of claim 45, wherein the gateway processor is further configured to receive return feeder link signals from the first one of the feeder link antennas and the second one of the feeder link antennas, and to process the received return feeder link signals to reduce interference in at least one of the return feeder link signals.

52. The satellite communications equipment of claim 51, wherein the gateway processor is further configured to time align at least some of the received return feeder link signals relative to one another prior to reducing interference in at least one of the return feeder link signals.

53. The satellite communications equipment of claim 52, wherein the gateway processor is further configured to generate an interference correction signal and to reduce interference in at least one return feeder link signal in response to the interference correction signal.

54. The auxiliary satellite of claim 52, wherein the auxiliary satellite is devoid of any configuration that allows the auxiliary satellite to communicate directly with radioterminals.

* * * * *